J. F. STEWARD.
ATTACHMENT TO AGRICULTURAL TRACTORS.
APPLICATION FILED DEC. 15, 1909.
1,045,338.
Patented Nov. 26, 1912.
3 SHEETS—SHEET 1.
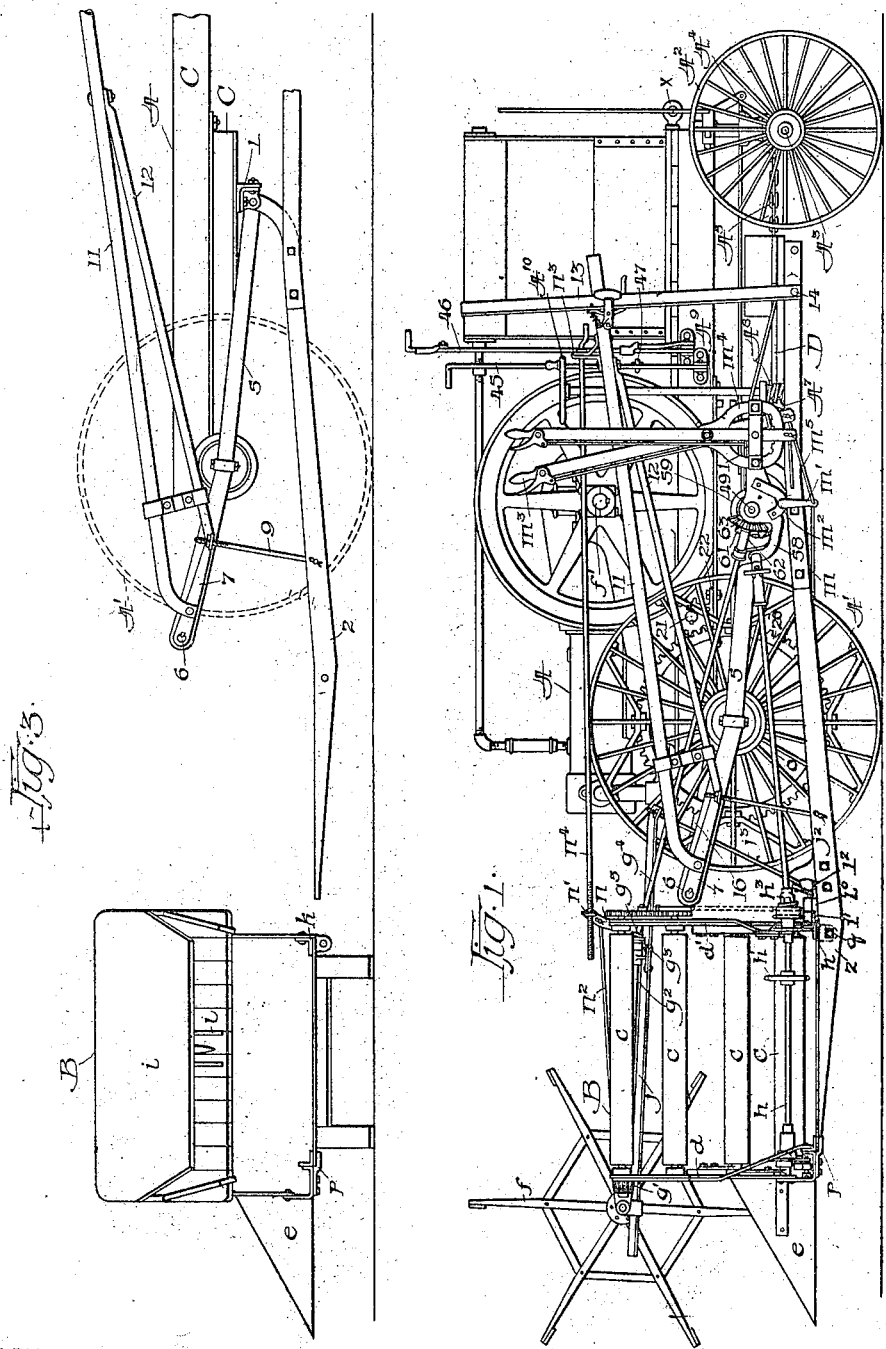

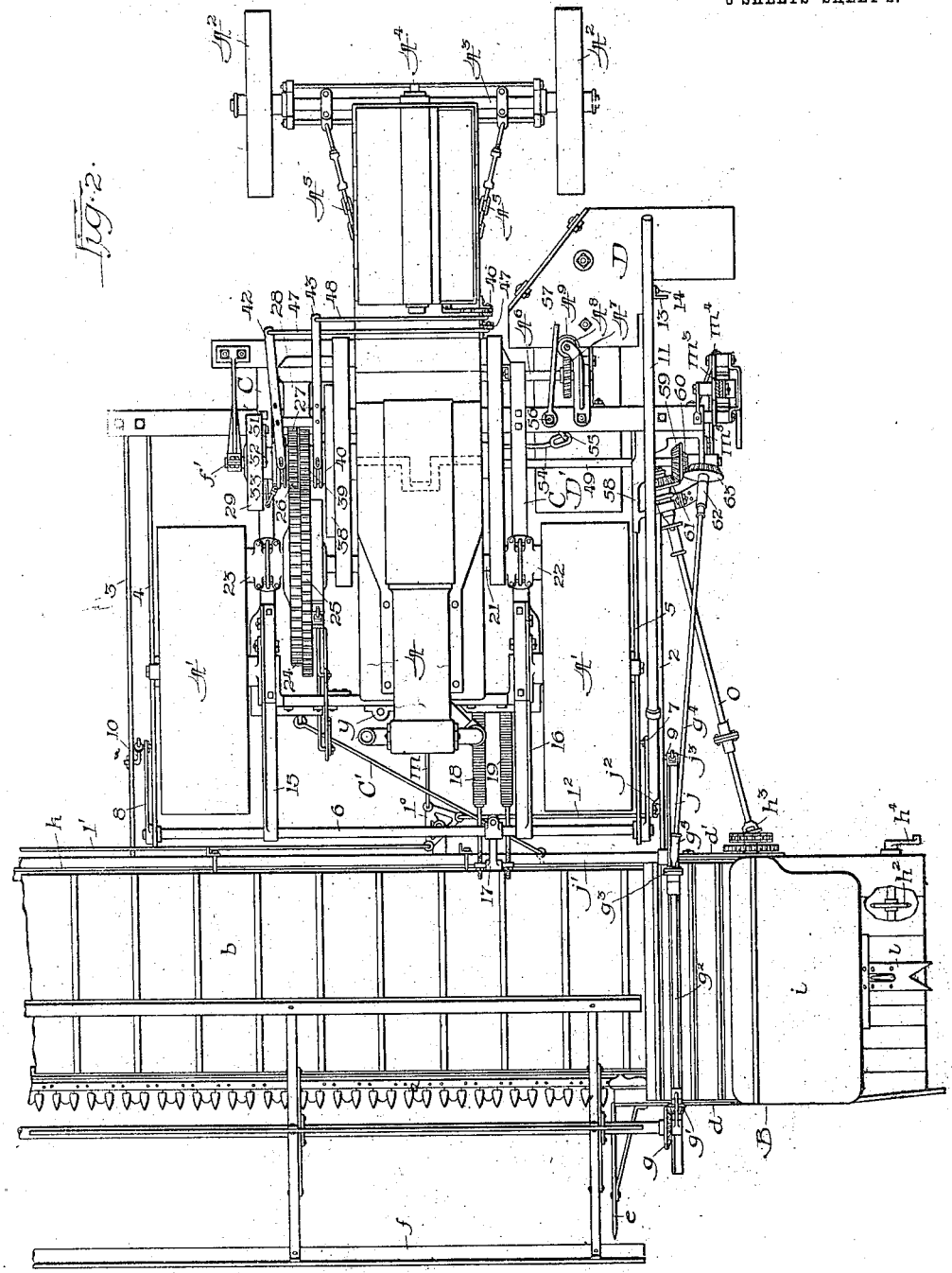

J. F. STEWARD.
ATTACHMENT TO AGRICULTURAL TRACTORS.
APPLICATION FILED DEC. 15, 1909.
1,045,338.
Patented Nov. 26, 1912.
3 SHEETS—SHEET 3.
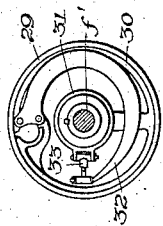
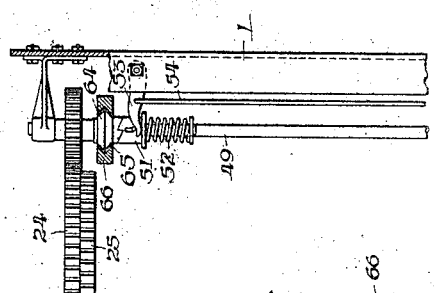
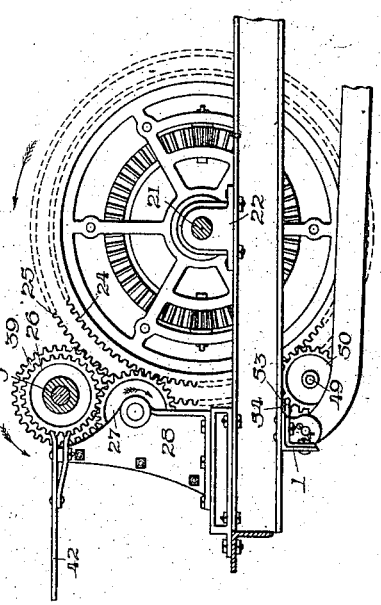
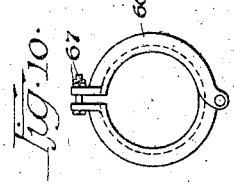
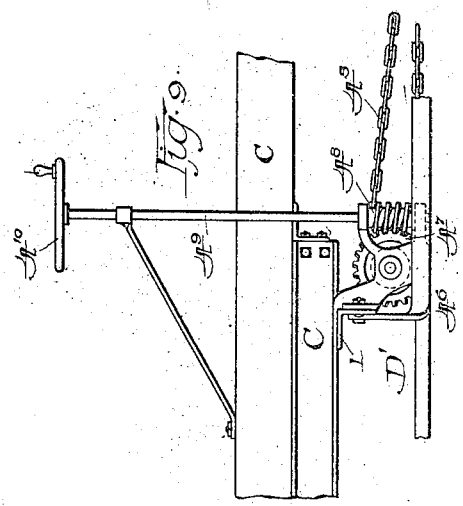
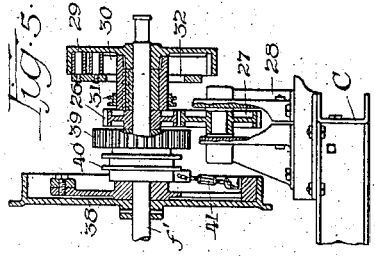
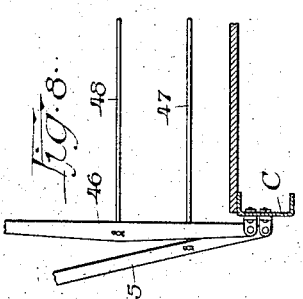
Witnesses:
F. W. Hoffmeister
D. E. Lockhart
Inventor
John F. Steward.

UNITED STATES PATENT OFFICE.

JOHN F. STEWARD, OF CHICAGO, ILLINOIS.

ATTACHMENT TO AGRICULTURAL TRACTORS.

1,045,338.  Specification of Letters Patent.  Patented Nov. 26, 1912.

Original application filed July 23, 1909, Serial No. 509,219. Divided and this application filed December 15, 1909. Serial No. 533,168.

*To all whom it may concern:*

Be it known that I, JOHN F. STEWARD, a citizen of the United States, residing at Chicago, in the county of Cook and State of Illinois, have invented certain new and useful Improvements in Attachments to Agricultural Tractors, of which the following is a full specification.

As shown in the drawings, my invention consists in an attachment to tractors or traction engines whereby they may carry and operate agricultural machinery, more particularly harvesting machinery, and in the means whereby the tractor is caused to operate the functional parts of the harvesting or other agricultural mechanism carried thereby.

The object of my invention is to adapt a traction engine to serve as motive power for general agricultural use, but more particularly for harvesting grain, and it mainly consists in adapting a traction engine to support, carry and operate the function performing portions of a harvesting machine.

I am aware that traction engines proper have carried harvesting devices, and also that internal combustion engines have been mounted upon harvesting machines; as, for instance, in patent granted to me February 17, 1903, No. 720,635. I prefer, however, to adapt a tractor to the purposes as specifically shown, and the specific adaptation of the invention consists in mounting upon the tractor the function performing parts of a harvesting machine with their normal rear in proximity to the normal rear of the tractor and also connecting the two mechanisms in such a manner that the motive power of the tractor shall not only move the harvesting mechanism, as it may be termed, through the field, but also transmit power to the various operative elements thereof.

In operating the machine the tractor is moved in its normal backward direction and the steering wheels thus become to be, for the time, situated at the rear of the machine, as a whole, when considered as traveling in the operative direction; that is, with the tractor moving in its normal backward direction. The arrangement of the two major elements of my combined machine; namely, the tractor part and harvesting parts, permits of better control than if the harvesting elements were placed at the normal forward end of the tractor, because of the fact that with the harvesting elements so placed, any considerable deflection of the steering wheels would produce too great a lateral swing of the cutting apparatus to do its work properly when not moving in a direct line. By placing these major elements, as I will term them, in the relative position shown, the control of the machine, as a whole, becomes more nearly like that of ordinary headers and header binders.

In the drawings—Figure 1 is a stubble-side elevation of my machine with a portion of the binding devices removed in order to show the elevator operating rollers; Fig. 2 is a plan view of the machine as a whole, less, however, the bundle carrier, which is usually attached; Fig. 3 represents a mere outline of the tractor, showing its support for the harvesting mechanism and also the harvesting mechanism, the two parts being separated; Figs. 4 and 5 show the means for transmitting power from the engine shaft to the gear which, in the tractor I have selected, imparts motion not only to the traction wheels but to the harvester portion of my combined machine; Fig. 6 is a side view of the clutch upon the engine shaft which gives rearward direction of movement to the tractor, as such, but forward direction to the machine as a whole, when operating in the field; Fig. 7 shows the parts provided for taking motion from the upper gears of the tractor to the harvesting mechanism; Fig. 8 shows the levers by which the clutches are controlled; Fig. 9 shows the arrangement of the tiller wheel; Fig. 10 shows the clamping ring, or safety device, to prevent breakage of the cutting, elevating and binding mechanism should such become obstructed.

A may be considered to represent the traction engine, and B the reeling, cutting, elevating and binding devices of a harvesting machine.

$A^1$ represents traction wheels, and $A^2$ the steering wheels thereof. The framework mainly consists of the bars C suitably connected by the base of the engine and other convenient parts. The bars C extend from front to rear, and upon them the engine is firmly mounted. Beneath these bars, as shown in Figs. 2, 4 and 9, is placed the strong bar 1, preferably of angle iron or steel, extending, as I deem best, some distance beyond the outer planes of the traction wheels A¹. Pivoted to each end of this angle bar 1 are the supporting arms 2 and 3, which, from preference, are placed outside of the traction wheels, thus separating them so far as to form a broad support for the harvesting elements of my combination of mechanism, however great the width of cut may be.

The axle of the traction wheels is permitted to extend some distance beyond the outer planes of the traction wheels, and on the ends, near their middles, are sustained the bars 4 and 5, which bars are also connected to the cross bar 1 at their lower ends by suitable bolting methods. They project sufficiently beyond the peripheries of the traction wheels at their other ends to receive and support a strong rock shaft 6. Upon the rock shaft are firmly secured the arms 7 and 8, and from these arms to the supporting arms 2 and 3 drop the connecting links 9 and 10, the said links being suitably pivoted in the said arms 7 and 8 and in the said supporting arms 2 and 3. The rock shaft 6 may be controlled by any means, but I have preferred to attach to the arm 7 the lever 11, suitably braced by the member 12. So arranged, the arm 7 and lever 11 become as one piece, in effect. The lever thus formed extends toward the normal front of the tractor, where it is provided with a latch adapted to engage openings in the bar 13, which is suitably secured at 14 to the framework of the tractor. The usual lever and its latch is thought preferable, but any means for effecting a change in the height of the harvesting mechanism from the ground may be substituted.

By means of the links 9 and 10, which are threaded at their upper ends, the supports for the harvesting element of the combination may not only be sustained but adjusted to any desired vertical position for the purpose of cutting short or long grain, thus enabling greater range than by the scope of the lever alone.

D D¹ is a foot board provided for the operator at the side of the tractor. Such position, preferably at the stubbleside, is for the purpose of placing him practically in line with the edge of the standing grain being operated upon, in order that he may guide the machine, as a whole, more closely than if at the normal rear of the tractor, as ordinarily constructed. It will thus be seen that the lever for controlling the height of cut is practically at his side. I have shown additional supports for the rock shaft 6, which consist in the strong arms 15 and 16 firmly bolted to the side bars C of the tractor frame. In order to counterpoise the weight of the harvesting element of my combined machine, I place an arm 17 upon the rock shaft 6, extending it forwardly and downwardly, and at its free end, by means of suitable rods, connect the springs 18 and 19, the latter in turn secured to a convenient part of the main frame of the tractor beneath the engine. Any of the well-known counterpoising and lever devices can easily be substituted for controlling the height of cut.

$a$ may be considered the cutting apparatus of an ordinary binding harvester, and $b$ the platform conveyer, by means of which the grain is carried to the elevating devices formed by the usual endless elevating canvases moved by the roller $c$, all supported by the usual framework. The rollers are journaled on the walls $d$ and $d^1$ of the main elevator frame. Extending forwardly from the stubble end of the cutting apparatus is the gathering board $e$, and $f$ is the reel. The parts of the harvester so far described are common to harvesting machinery and need not be explained in detail, as the specific means of construction form no part of my present invention. This is true equally of the binding devices.

Upon the reel shaft is the gear $g$, with which meshes the bevel pinion $g^1$, the latter secured to the shaft $g^2$, which is suitably journaled in the upper portion of the frame of the elevating devices, and at its rear end is provided with the universal joint coupling $g^3$. For purposes of giving movement to the elevating and binding devices the shaft $h$ is suitably journaled upon the front and rear bars forming the framework of the grain receiving platform. Upon this shaft is placed a sprocket wheel $h^1$, from which a chain passes up to a similar sprocket wheel $h^2$ on the packer shaft of an ordinary binding attachment, a mere outline $i$ of which attachment is shown. Upon the rear end of this shaft are placed two sprocket wheels, from each of which a chain passes to similar sprockets on the journals of the elevator actuating rollers, as on many header binders shown in various patents. At the rear end of the shaft $h$ is a universal joint coupling $h^3$.

The reel shaft at its stubbleward end is journaled in a slidable bearing upon the strong metallic bar $j$, and the latter is pivoted upon the shaft, $j^1$, which is preferably of gas pipe, its rear end extending some distance beyond the said gas pipe shaft, as shown in Fig. 1. The grainward end of the reel is supported in the same manner. From the end of the bar $j$, extending downwardly to the bell crank $j^2$, is the rod $j^3$. From the corresponding end of the grainward supporting bar of the reel, that is, the rearward extension of the bar corresponding to that $j$, is dropped a rod to the usual bell crank. Pivoted on the rear bar of the grain receiving platform $k$ corresponding with that $j^2$, is the bell crank $l^0$, and to one arm of this crank is connected the rod $l^1$ (see Fig. 2) and to the other arm of the bell crank the rod $l^2$, the rod $l^1$ connecting with the bell crank at the grain end of the machine which controls the vertical adjustment of the reel in the same manner as the stubbleward end is controlled. The rod $l^2$ connects with the bell crank $j^2$. Extending from the bell crank at the rear of the harvester platform and beneath the engine is the rod $m$, connected to an arm $m^1$ on the shaft $m^2$. The two arms upon the shaft $m^2$ being parallel, but one can be seen in the figures, although they are some distance apart. $m^3$ is a lever pivoted upon the quadrant bracket $m^4$, and extending downwardly below its axis of movement, and from it to arm $m^1$, is extended the arm $m^5$. By movement of lever $m^3$ the rock shaft $m^2$ is moved and the bell crank $l^0$ at the rear of the grain receiving platform is, in turn, moved and the reel thus raised or lowered at will. Upon the bar $j^1$ the supporting arms are adapted to oscillate in raising and lowering the reels, but the bar is also adapted to rock in its supports. Extending upwardly from the said bar, and firmly secured to it, is the arm $n$, having the nut $n^1$ pivoted at its upper end, and extending also from near its upper end is the rod $n^2$, the latter connected with the slidable journal bearing of the reel shaft. The arm $n$ and rod $n^2$ are duplicated at the grain end of the harvesting mechanism. Upon the rear end of the lever $l^1$ as a convenient place to receive it, I place a support $n^3$ for the rear end of the screw threaded shaft $n^4$. By means of a crank formed on the rear end of the threaded shaft the reel supporting bar $j^1$ may be rocked through the instrumentality of the arm $n$, and by means of the rod $n^2$ and the corresponding arm and rod at the grainward end of the harvester reel, may be moved backwardly and forwardly.

Extending from the universal joint coupling $q^3$, at the rear of the reel driving shaft, is connected a shaft $q^4$, which passes diagonally downward and backward from the said shaft to suitable gearing upon the frame of the tractor. In order that the said shaft may be quickly detached, a slip coupling $q^5$ is provided at its forward end and also at its rearward end, where a similar knuckle on the coupling is provided. Precisely the same arrangement of couplings is provided for the shaft $o$ as that which extends from the rear end of the shaft $h$ to suitable gearing on the tractor frame.

The supporting arms 2 are connected beneath the grain receiving platform by their forward ends after entering into sockets $p$, as shown in Fig. 1, and by being bolted to strong lugs beneath the rear bar of the platform. The nut $n^1$ is made removable by being secured to the arm $n$ by means of spring cotter or otherwise. The rod $m$ is similarly connected to the bell crank $l^0$. By disconnecting the two rods and by removal of the bolt $q$, as shown in Fig. 1, and a similar bolt connecting the supporting bar 3 to the rear portion of the grain receiving platform, the tractor may be drawn away from the harvester and binder portion, the slip couplings of the shafts $q^4$ and $o$ permitting such withdrawal. In order that the harvester portion may be left in such position, when taken from the tractor, that the tractor may be returned to position conveniently, it is well, when removing the harvester portion, to raise it and place thereunder suitable blocking or trestle, as shown in Fig. 3, so that the tractor may be backed to position and its supporting bars thrust to place under the receiving platform.

Coming now to the tractor proper: The engine, as stated, may be of any well-known type, the only essential being that the crank shaft $f^1$ be provided with pinions from which motion may be imparted to the traction wheels and clutches by means of which the tractor may be moved in either direction desired.

Turning to Fig. 1, a large gear 20 is seen secured to the rim of the traction wheel. A corresponding gear is also placed upon the grain side traction wheel $A^1$. 21 is a shaft extending through the framework, supported in the bearings 22 and 23, which, in turn, are firmly secured to the side bars of the main frame of the tractor. Upon each end of this shaft are pinions adapted to mesh into the gears of the traction wheels. Upon the shaft is the double gear 24 and 25, which within itself has the differential gearing usual in tractors, as seen in Fig. 4. Intermediate the gear 24 and the pinion 26 is the pinion 27; its shaft journaled in the standard 28, the intermediate pinion 27 adapted to mesh with the smaller portion 24 of the double gear referred to.

In Fig. 5 the clutch mechanism is shown. 29 is a friction clutch of the type shown in Fig. 6, in which the cup-shaped disk is firmly keyed to the engine shaft. 30 is an open ring, having, however, a strong hub, by means of which it is connected to the hub of the pinion 26. Upon the hub is the annularly grooved sleeve 31, and connecting this hub with the curved lever 32 is the link 33. By movement of the annularly grooved sleeve upon the hub of the pinion 26 the end of link 33 is forced longitudinally, relative to the shaft, and the lever 32 thus moved so as to expand the ring, the lever being pivotally connected as shown to each end of the ring. Forming no part of my invention, and being of a common kind, this clutch need not be further described. Any suitable clutch may be substituted therefor, preferably a friction clutch so as to avoid shock when engagement is produced. The clutch disk is securely keyed to the crank shaft of the engine or may be secured to any constantly rotating shaft of the engine. As the ring 30, at its hub, is splined to the hub of the pinion 26, when the ring is expanded by means of the movement of the split ring and the link 33, the ring becomes clutched to the constantly rotating disk, and thus the intermediate gear 27 is given rotation and, in turn, the double gears 24 and 25 are rotated in the direction indicated by the arrows in Fig. 4.

Upon the crank shaft of the engine, or any shaft that may be utilized for the purpose as imparting its movement to the traction gearing, is also the clutch disk 38. Upon the same shaft is the pinion 39, and upon the hub of the pinion is the clutch ring 40. Radiating from this ring are links 41, only one of which is shown, however, in the sectional view, Fig. 5, but there may be any number. This clutch is of an ordinary form and need not be further described. Suffice it to say that any well-known clutch may be substituted for it, preferably, however, a friction clutch. Two forms of clutch are shown simply because the clutches of the tractor availed of were so made.

Upon the frame of the engine are the levers 42 and 43, and each lever is forked and provided with pins which enter the annular grooves in the clutch rings. By movement of either lever the clutch it controls may be thrown into engagement and thus either of the pinions upon the shaft be made to do the work required. As stated, with the clutch which controls the pinion 26 thrown into engagement, the gearing will move in the direction indicated by the arrows in Fig. 4, but with the clutch 38 and its parts engaged and the clutch 29 out of engagement, the pinion 39 will mesh directly with 25 of the double gear and the tractor will be moved in a reverse direction. The levers are connected by a link, as is common, in order that movement to place the clutch in engagement shall throw the other clutch out of engagement. In operation in the field, with the harvesting portions moving in the proper direction, the tractor will be driven backward because of the pinion 26 being clutched to the motor shaft $f^1$.

In order that the clutch may be controlled from the operator's stand D, I mount levers 45 and 46 upon the frame and connect clutch levers therewith by the links 7 and 48. The location of the levers 42 and 43 may be practically on the same plane so that both clutches cannot be engaged at the same time, the clashing of the levers preventing such a result.

The wheels $A^2$ are mounted on the axle $A^3$, which is pivoted at $A^4$ beneath the normal front of the engine frame. Extending from near each end of the axle are the chains $A^5$. These chains pass toward the normal rear of the tractor frame and are wound spirally around a drum $A^6$, as shown in Fig. 9. Upon the shaft of this drum, as shown in Figs. 2 and 9, is the worm wheel $A^7$, and meshing therewith is a worm $A^8$, the latter upon the vertical shaft $A^9$ suitably journaled and having the hand wheel $A^{10}$. By means of the hand wheel the direction of movement of the tractor is controlled at will, substantially as in ordinary tractors and traction engines, except in the matter of position of the tiller wheel.

I transmit power from the gearing of the tractor preferably by utilizing the one member of the double gear 24 and 25. 49 is a shaft supported in suitable bearings upon the angular bar 1. Its right end, relative to the direction of advance of the machine in harvesting, is provided with a pinion 50, so located as to mesh with 24 of the double gear. The pinion 50 is indirectly connected to the shaft 49 by clutching thereto. In order that the shaft 49 may not always be driven with the full force of the engine, I provide a safety coupling, soon to be described. Connected to the hub of the pinion by the safety coupling is one element of a clutch. 51 is a coöperating clutch member movable longitudinally upon the shaft 49, and the two clutch elements are held in contact by the spring 52 surrounding the shaft. 53 is a lever pivoted upon the bar 1. 54 is a rod extending from the clutch lever to a crank 55 on a vertical shaft 56 pivoted in the bar 1 and having the lever 57. By means of these parts the clutch elements are permitted to engage or be forced from engagement at will.

In suitable bearings upon the stubble end of the shaft 49, which is suitably supported in the bearing bracket 58, is the bevel gear 59, having as one part with it the bevel pinion 60. Supported in the same bracket 58 is the short shaft having the bevel gear 61 meshing into the gear 59. Connecting this short shaft with the shaft $h$ is the shaft $o$, connected by knuckle joints to the shafts from which and to which it transmits motion. The shaft $h$ is provided with the crank $h^4$, and hence, through the shaft $o$, not only the elevating and binding devices but the cutting apparatus is given movement. Bolted to the bracket 58 is the bearing 62, and in this is journaled a short shaft having the bevel gear 63 which meshes into the bevel pinion 60. To this short shaft is connected, by knuckle joints, the shaft $g^4$, which imparts motion to the reel. It is thus seen that by movement of the clutch lever 57, within reach of the operator, all of the mechanism of the harvesting portion of my combined machine may be thrown out of action.

The bar 1 is connected to the sills C by means of bolts, as shown in Fig. 2. By removal of these bolts and the bolts which connect the bars 4 and 5 to the end of the axle, and also by removal of the bolts connecting the arms 15 and 16 to the main sills C the attaching parts, by means of which the harvester portion and the tractor portion are connected, may be taken away and the tractor permitted to be moved away.

The safety coupling I prefer to use is shown in Fig. 7, where 64 is a disk formed on the hub of the pinion 50. 65 is a disk having clutch teeth. The peripheries of these two disks are so shaped as to form an inverted V. Upon this is placed the clamp 66, having a V groove of such size as to fit upon the peripheries of the parts 64 and 65. By use of the bolt and nut 67, passing through lugs on the two members of the clamping ring, any desired amount of friction may be produced, and hence the shaft 49 driven with any degree of positiveness desired. The safety device may be upon any of the revolving parts between the engine and the operative parts of the binding mechanism. It may, if desired, be placed upon the shaft o, the latter made of two parts, each part having a disk secured to it, the said disk being connected by wooden pins, as is common in some kinds of machinery. Upon the cutting apparatus striking an obstruction or the binding devices choking, the pins will be cut off and thus avoid breakage.

Considering my invention in its broadest sense, it will be seen that the essential elements are the harvesting mechanism, the tractor supporting same and means for imparting movement to the harvesting mechanism, preferably from the gearing of the tractor. The broad idea may be embodied in many suitable forms. The harvesting element may be of any of the many kinds competent to do the work. This is also true with the tractor. I do not limit myself to the specific means shown for connecting the harvester portion and to supporting it on the tractor, nor do I limit myself to the specific means by which movement to the harvester portion is transmitted from the tractor gearing. I have embodied the broad idea in preferably specific forms, but mechanics wishing to avail themselves of the invention may find other forms desirable to correspond with modified forms of tractors or modified forms of a harvesting device.

I have shown what I consider the preferable means for imparting motion to the harvesting devices; that is, by connecting the said devices to gearing upon the tractor, but, if preferred, a small engine may be carried upon the tractor, or upon the harvester, to give motion to the harvester portion, as has been frequently accomplished on harvesting machines drawn by horses and as shown in my patent above referred to, but independent of the supporting traction wheels. While I have shown the reel as driven by an independent shaft from the tractor, it may, however, be driven by the single shaft o, as often used in headers and header binders, which transmits motion from the gearing to other operative parts.

The tractor proper is provided at both its normal front and rear with means, the eye $x$ for attaching plows, wagons or other objects to be drawn. By placing the tiller wheel and controlling levers of the clutches of the engine adjacent the operator's stand D and $D^1$, the tractor is better adapted to general purposes.

The harvesting mechanism as a whole, supported upon the bars 2 and 3, is maintained in its height from the ground by the connecting links 9 and 10; in other words, the bars and their load are supported by the links which, were provision not otherwise made, would permit the harvesting apparatus to swing laterally and throw the sustaining arms in contact with the traction wheels and affect the regularity of the line of cut. To provide against this a brace $C^1$ is secured to the corner of the tractor frame at one end, at a low point, and extends diagonally stubbleward and forward, where, in turn, it is pivoted to the rear sill of the harvesting mechanism platform frame. This brace is, in fact, a radius rod which prevents all tendency of the harvesting apparatus to swing on the rods which suspend it. Being pivoted at both ends, however, the raising and lowering of the said parts is not affected, although the brace forces them to move in a slight arc of a circle. The connecting devices for imparting motion to the harvester gearing, being provided with knuckled joints, permit a slight lateral swinging movement produced by the brace during changes in elevation of the parts sustained by said links.

What I claim as my invention, and desire to secure by Letters Patent, is:

1. In combination with a tractor, an attachment adapted to sustain and actuate mechanism to be carried thereby, said attachment consisting of a transverse frame-member sustained by the frame of said tractor and located between the axle of the traction wheels and the axle of the steering wheels, said transverse member projecting laterally beyond the plane of one of said traction wheels, a longitudinal member secured to the said transverse member and extending outside of the plane of one of said traction wheels and beyond the periphery thereof, for the support of said mechanism carried by the said tractor, said longitudinal member sustained by said transverse member and by the axle of the traction wheels, and gearing mounted on said transverse member for operating the mechanism carried by the said tractor.

2. In combination with a tractor, an attachment adapted to sustain and actuate mechanism to be carried thereby, said attachment consisting of a transverse frame-member sustained by the frame of said tractor and located between the axle of the traction wheels and the axle of the steering wheels, said transverse member projecting laterally beyond the plane of one of said traction wheels, a longitudinal member secured to the said transverse member and extending outside of the plane of one of said traction wheels and beyond the periphery thereof, for the support of said mechanism carried by the said tractor, said longitudinal member sustained by said transverse member and by the axle of the traction wheels, gearing mounted on said transverse member for operating the mechanism carried by the said tractor, and a stand for the operator supported on said transverse member.

3. In combination with a tractor, an attachment adapted to sustain and actuate mechanism to be carried thereby, said attachment consisting of a transverse frame-member sustained by the frame of said tractor and located between the axle of the traction wheels and the axle of the steering wheels, said transverse member projecting laterally beyond the plane of one of said traction wheels, a longitudinal member secured to the said transverse member and extending outside of the plane of one of said traction wheels and beyond the periphery thereof, for the support of said mechanism carried by the said tractor, said longitudinal member sustained by said transverse member and by the axle of the traction wheels, gearing mounted on said transverse member for operating the mechanism carried by the said tractor, a stand for the operator supported on said transverse member, and controlling mechanism for the engine of said tractor placed adjacent to the said operator's stand, the latter located on the projecting end of said transverse member.

4. In combination with a tractor, an attachment adapted to sustain and actuate mechanism to be carried thereby, said attachment consisting of a transverse frame-member sustained by the frame of said tractor and located between the axle of the traction wheels and the axle of the steering wheels, said transverse member projecting laterally beyond the plane of one of said traction wheels, a longitudinal member secured to the said transverse member and extending outside of the plane of one of said traction wheels and beyond the periphery thereof, for the support of said mechanism carried by the said tractor, said longitudinal member sustained by said transverse member and by the axle of the traction wheels, gearing mounted on said transverse member for operating the mechanism carried by the said tractor, and a stand for the operator supported on said transverse member, controlling mechanism for the engine of said tractor placed adjacent to the said operator's stand, the latter located on the projecting end of said transverse member, and means for controlling the direction of movement of the tractor placed convenient to said operator's stand.

5. In combination with a tractor, an attachment adapted to sustain and actuate mechanism to be carried thereby, said attachment consisting of a transverse frame-member sustained by the frame of said tractor and located between the axle of the traction wheels and the axle of the steering wheels, said transverse member projecting laterally beyond the plane of one of said traction wheels, a longitudinal member secured to the said transverse member and extending outside of the plane of one of said traction wheels and beyond the periphery thereof, for the support of said mechanism carried by the said tractor, said longitudinal member sustained by said transverse member and by the axle of the traction wheels, gearing mounted on said transverse member for operating the mechanism carried by the said tractor, a stand for the operator supported on said transverse member, controlling mechanism for the engine of said tractor placed adjacent to the said operator's stand, the latter located on the projecting end of said transverse member, means for controlling the direction of movement of the tractor placed convenient to said operator's stand, and means adjacent to the operator's stand for controlling the backward and forward movement of the said tractor.

6. In combination with a tractor, an attachment adapted to sustain and actuate mechanism to be carried thereby said attachment consisting of a transverse frame-member sustained by the frame of said tractor and located between the axle of the traction wheels and the axle of the steering wheels, said transverse member projecting laterally beyond the plane of one of said traction wheels, a longitudinal member secured to the said transverse member and extending outside of the plane of one of said traction wheels and beyond the periphery thereof, for the support of said mechanism carried by the said tractor, said longitudinal member sustained by said transverse member and by the axle of the traction wheels, gearing mounted on said transverse member for operating the mechanism carried by the said tractor, a stand for the operator supported on said transverse member, controlling mechanism for the engine of said tractor placed adjacent to the said operator's stand, the latter located on the projecting end of said transverse member, means for controlling the direction of movement of the tractor placed convenient to said operator's stand, means adjacent to the operator's stand for controlling the backward and forward movement of the said tractor, and means adjacent to the operator's stand for controlling the backward and forward movement and the direction of movement of the tractor.

7. In combination with a tractor, an attachment adapted to sustain and actuate mechanism to be carried thereby, said attachment consisting of a transverse frame-member sustained by the frame of said tractor and located between the axle of the traction wheels and the axle of the steering wheels, said transverse member projecting laterally beyond the plane of one of said traction wheels, a longitudinal member secured to the said transverse member and extending outside of the plane of one of said traction wheels and beyond the periphery thereof, for the support of said mechanism carried by the said tractor, said longitudinal member sustained by said transverse member and by the axle of the traction wheels, gearing mounted on said transverse member for operating the mechanism carried by the said tractor, a stand for the operator supported on said transverse member, controlling mechanism for the engine of said tractor placed adjacent to the said operator's stand, the latter located on the projecting end of said transverse member, means for controlling the direction of movement of the tractor placed convenient to said operator's stand, means adjacent to the operator's stand for controlling the backward and forward movement of the said tractor, means adjacent to the operator's stand for controlling the backward and forward movement and the direction of movement of the tractor, and means adjacent to said operator's stand for engaging and disengaging the gearing mounted on said transverse bar-member from the operative parts of the implement carried by the said tractor.

8. In combination with a tractor, an attachment adapted to sustain and actuate mechanism to be carried thereby, said attachment consisting of a transverse frame-member sustained by the frame of the tractor and located between the axle of the traction wheels and the axle of the steering wheels, said transverse frame-member projecting beyond the planes of the said traction wheels, longitudinal members secured to the said transverse member and extending outside of the planes of the traction wheels and beyond the peripheries thereof, for the support of the mechanism carried by the said tractor, said longitudinal members further sustained by the axle of the traction wheels, and secondary longitudinal members connected to the ends of the said transverse member and sustained by the first mentioned longitudinal members.

9. In combination with a tractor, an attachment adapted to sustain and actuate mechanism to be carried thereby, said attachment consisting of a transverse frame-member sustained by the frame of the tractor and located between the axle of the traction wheels and the axle of the steering wheels, said transverse frame-member projecting beyond the planes of the said traction wheels, longitudinal members secured to the said transverse member and extending outside of the planes of the traction wheels and beyond the peripheries thereof, for the support of the mechanism carried by the said tractor, said longitudinal members further sustained by the axle of the traction wheels, secondary longitudinal members connected to the ends of the said transverse member and sustained by the first mentioned longitudinal members, and adjustable means connecting the first longitudinal members to the secondary longitudinal members.

10. In combination with a tractor, an attachment having, in combination, means for sustaining objects to be lifted, carried and actuated, including side arms supported at one end to a cross member of the tractor frame, between the forward and rearward axles of the supporting wheels, sustaining arms connected to the main tractor frame at points between the axle of the said supporting wheels and to the ends of the axle of the traction wheels and extending beyond the peripheries thereof, a rock-shaft supported on the said arm and having, in turn, radial arms, a lever for moving said rock-shaft, secondary longitudinal arms for sustaining the object to be carried pivoted to the main tractor frame and links connecting the radial arms of the rock-shaft to said secondary longitudinal arms.

JOHN F. STEWARD.

Witnesses:
 D. E. LOCKERT,
 F. W. HOFFMEISTER.